US010572336B2

(12) United States Patent
Aloysious et al.

(10) Patent No.: US 10,572,336 B2
(45) Date of Patent: Feb. 25, 2020

(54) COGNITIVE CLOSED LOOP ANALYTICS FOR FAULT HANDLING IN INFORMATION TECHNOLOGY SYSTEMS

(71) Applicant: International Business Machines Corporation, Armonk, NY (US)

(72) Inventors: Goldy Mathew Aloysious, Bengaluru (IN); Awadesh Tiwari, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 15/933,554

(22) Filed: Mar. 23, 2018

(65) Prior Publication Data

US 2019/0294489 A1    Sep. 26, 2019

(51) Int. Cl.
| | | |
|---|---|---|
| *G06F 11/34* | (2006.01) | |
| *G06F 11/07* | (2006.01) | |
| *G06N 5/02* | (2006.01) | |
| *G06F 16/21* | (2019.01) | |

(52) U.S. Cl.
CPC ...... *G06F 11/0793* (2013.01); *G06F 11/0709* (2013.01); *G06F 11/0772* (2013.01); *G06F 16/219* (2019.01); *G06N 5/02* (2013.01)

(58) Field of Classification Search
CPC .................................................. G06F 11/079
USPC ........................................................ 714/26
See application file for complete search history.

(56) References Cited

U.S. PATENT DOCUMENTS

| | | |
|---|---|---|
| 8,380,838 B2 | 2/2013 | Bose et al. |
| 8,639,988 B2 | 1/2014 | Wang et al. |
| 2004/0168100 A1* | 8/2004 | Thottan ............... H04L 41/0213 714/4.1 |
| 2004/0220786 A1* | 11/2004 | Tiwari ..................... G06F 17/10 703/2 |
| 2008/0091628 A1* | 4/2008 | Srinivasa ................. G06N 3/08 706/12 |
| 2008/0097945 A1* | 4/2008 | Greis ................... G06F 11/3013 706/21 |
| 2010/0017350 A1 | 1/2010 | Kar et al. |
| 2014/0040174 A1 | 2/2014 | Leung et al. |
| (Continued) | | |

OTHER PUBLICATIONS

Kumawat et al., "Intrusion Detection and Prevention System Using K-Learning Classification in Cloud," IEEE, Computing for Sustainable Global Development (INDIACom), 2016 3rd International Conference on, Mar. 16-18, 2016, INSPEC Accession No. 16426224.

*Primary Examiner* — Chae M Ko
(74) *Attorney, Agent, or Firm* — Yee & Associates, P.C.

(57) ABSTRACT

A computer-implemented method, system, and non-transitory computer program product for fault handling for an information technology system. Historical data for the information technology system is read from a database. A continued fraction model is applied to the historical data to generate spatial metrics. Real-time parameters for the information technology system are received. Jacobian modeling is applied to the real-time parameters to generate state space metrics. The spatial metrics and the state space metrics are combined using a recurrent space transformer to identify an actionable event in the information technology system. The recurrent space transformer maps the spatial metrics and the state space metrics to a common space. An alert is generated in response to identifying the actionable event in the information technology system.

20 Claims, 6 Drawing Sheets

(56) References Cited

U.S. PATENT DOCUMENTS

2016/0350173 A1 12/2016 Ahad
2016/0371489 A1 12/2016 Puri et al.
2017/0147722 A1* 5/2017 Greenwood ............ G06F 17/00

* cited by examiner

FIG. 6

COGNITIVE CLOSED LOOP ANALYTICS FOR FAULT HANDLING IN INFORMATION TECHNOLOGY SYSTEMS

BACKGROUND INFORMATION

1. Field

The present disclosure relates generally to systems and methods for identifying and predicting faults and performance degradations in information technology systems.

2. Background

Current fault management systems may be able to identify and predict faults and performance degradations in the physical and logical infrastructure of an information technology system. Such fault management systems may analyze performance data to learn the normal behavior of an information technology system. A fault management system may then create a performance model of the information technology system and use this model to detect or forecast behavior outside of the modelled range. An alarm may be generated when behavior of the information technology system that is outside of the modeled range is detected or forecast. For example, without limitation, current fault management systems may use multivariate correlation to detect performance anomalies for information technology systems.

Current fault management systems may generate a relatively large number of alarms. Each alarm generated by a fault management system may result in an operator opening a new item, which may be known as a "ticket", in an issue tracking system that may be used by an organization to report and track the status of problems in an information technology system. Alternatively, or in addition, an operator may spend a significant amount of time analyzing each alarm manually before deciding on whether or not a new ticket should be opened.

Current fault management systems may not provide alarms that reliably indicate faults in an information technology system.

SUMMARY

The illustrative embodiments provide a computer-implemented method of fault handling for an information technology system. Historical data for the information technology system is read from a database. A continued fraction model is applied to the historical data to generate spatial metrics. Real-time parameters for the information technology system are received. Jacobian modeling is applied to the real-time parameters to generate state space metrics. The spatial metrics and the state space metrics are combined using a recurrent space transformer to identify an actionable event in the information technology system. The recurrent space transformer maps the spatial metrics and the state space metrics to a common space. An alert is generated in response to identifying the actionable event in the information technology system.

The illustrative embodiments also provide a system for fault handling for an information technology system comprising a decision optimization system and a decision optimization unit. The decision optimization system is configured to read historical data for the information technology system from a database, apply a continued fraction model to the historical data to generate spatial metrics, receive real-time parameters for the information technology system, apply Jacobian modeling to the real-time parameters to generate state space metrics, and combine the spatial metrics and the state space metrics using a recurrent space transformer to identify an actionable event in the information technology system. The recurrent space transformer maps the spatial metrics and the state space metrics to a common space. The decision optimization unit is configured to generate an alert in response to identifying the actionable event in the information technology system.

The illustrative embodiments also provide a non-transitory computer-readable storage medium storing program code. When executed by a processor, the program code performs a computer-implemented method of fault handling for an information technology system, comprising reading historical data for the information technology system from a database, applying a continued fraction model to the historical data to generate spatial metrics, receiving real-time parameters for the information technology system, applying Jacobian modeling to the real-time parameters to generate state space metrics, combining the spatial metrics and the state space metrics using a recurrent space transformer to identify an actionable event in the information technology system, and generating an alert in response to identifying the actionable event in the information technology system. The recurrent space transformer maps the spatial metrics and the state space metrics to a common space.

Other variations are possible, as described below.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account a variety of considerations. For example, the illustrative embodiments recognize and take into account that the current practice of manually analyzing and classifying each alarm generated by a fault management system as being either actionable or non-actionable may take an undesirable amount of time, may be undesirably costly, and may place an undesirable load on the information technology system infrastructure being analyzed. Furthermore, a relatively high level of technical skill may be required to determine accurately whether an alarm generated by a fault management system should be categorized as actionable or non-actionable. Therefore, current fault management systems may require an undesirably high workload and skill level for information technology personnel.

The illustrative embodiments also recognize and take into account that a significant number of the alarms generated by current fault management systems may be "false positives". For example, current fault management systems may not have domain specific intelligence in-built, which potentially generates a significant amount of non-actionable alarms. For example, an alarm may be generated in a case where a current fault management system detects or forecasts behavior of an information technology system that is outside of the normal behavior of the information technology system but that is not the result of any fault in the information technology system. If an alarm generated by the fault management system is such a false alarm, the time spent analyzing the alarm and, possibly, opening and tracking a ticket, is wasted, because the alarm is not based on a fault in the system and thus there is no action that needs to be taken.

Illustrative embodiments leverage a continued fraction model and Jacobian modeling to create a cognitive system with a real-time dashboard to manage and operate an information technology infrastructure. Traditionally, a continued fraction model is used to find coefficients and order reduction. In accordance with an illustrative embodiment, a continued fraction model is modified to work on a selected subset of features. Illustrative embodiments provide for the prediction and computation of metrics and states, not merely order reduction. A continued fraction model in electrical engineering and control theory is used for order reduction, not state reduction. A basic assumption for the conventional use of continued fraction model is that a system may be expressed in a closed form transfer function as G(s). In accordance with an illustrative embodiment, such limitations are eliminated by having unbounded metrics, including historical as well as time series metrics from a fault management system and a database.

A continued fraction model traditionally requires a transfer function to start with. In accordance with an illustrative embodiment, however, no closed form transfer function is required to describe a system. In accordance with an illustrative embodiment, system coefficients are not known nor established. Metrics depend on both space and time. In accordance with an illustrative embodiment, a continued fraction model is used to select a subset of features after extraction and then mapping to system behavior and not coefficients.

Figure 1:
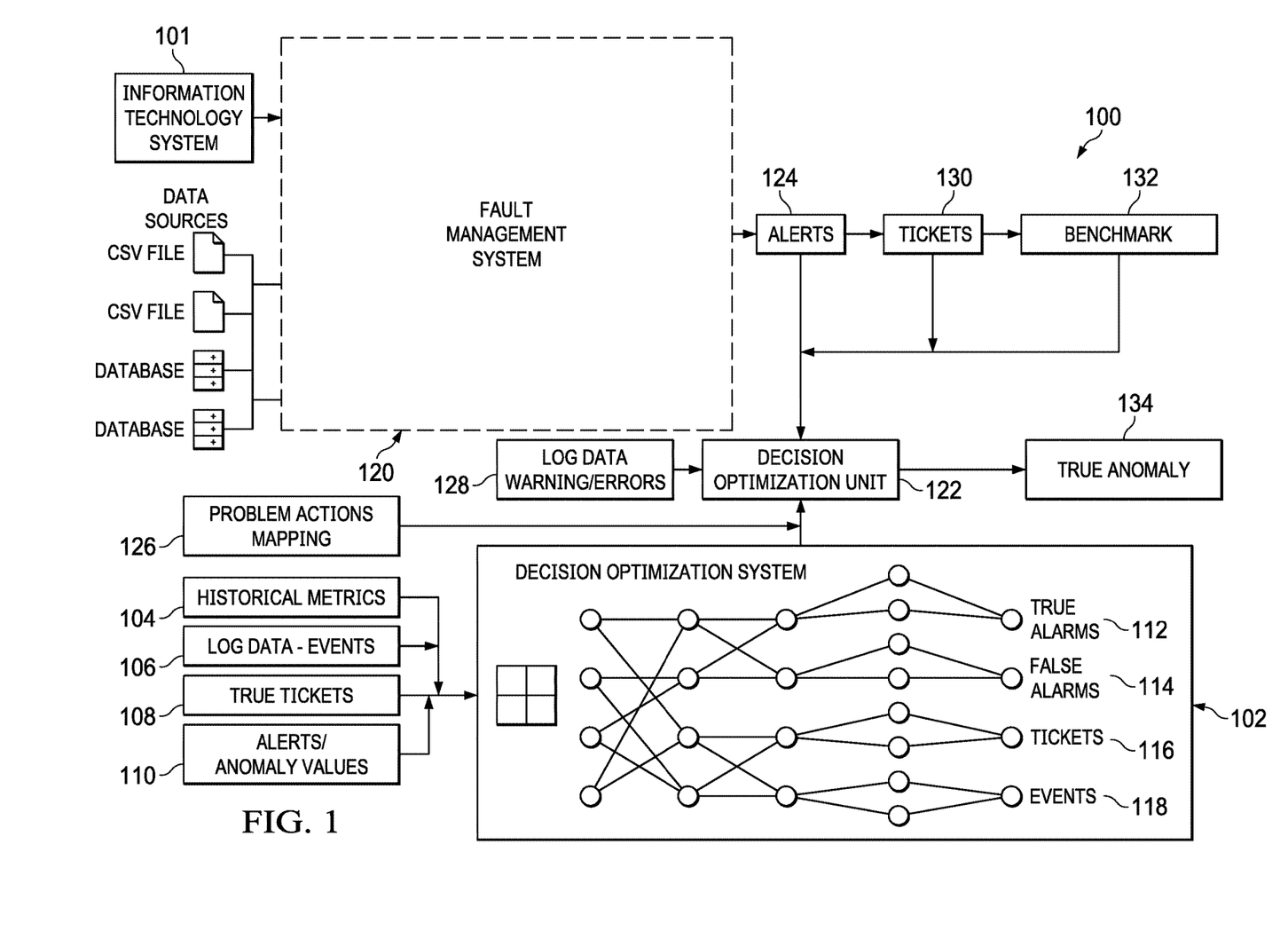
FIG. 1 is a block diagram of a cognitive closed loop analytics system for fault handling in accordance with an illustrative embodiment.

Turning to FIG. 1, a block diagram of a cognitive closed loop analytics system for fault handling is depicted in accordance with an illustrative embodiment. In accordance with an illustrative embodiment, cognitive closed loop analytics system 100 may be configured for handling faults that may be indicated in information technology system 101. Information technology system 101 may comprise an information technology system of any appropriate size or composition of data processing devices.

Cognitive closed loop analytics system 100 comprises decision optimization system 102. Decision optimization system 102 receives historical data and real-time data as inputs. For example, without limitation, decision optimization system 102 may receive as inputs historical metrics 104 from a fault management system, logged data events 106, true tickets 108, and real-time fault management system alerts and anomaly values 110. Decision optimization system 102 is configured to process the inputs to identify true alarms 112, false alarms 114, tickets 116, and events 118. The output of decision optimization system 102 may be provided to decision optimization unit 122.

Fault management system 120 may generate alerts 124 from which tickets 130 may be generated. However, some of alerts 124 may be false alarms. Benchmark 132 may be established to distinguish between alerts 124 that were true and useful and alerts 124 that were false and not useful. For example, without limitation, benchmark 132 may be implemented by a human operator providing an indication for each of tickets 130 whether the ticket was true and useful or false and not useful. Benchmark 132, along with alerts 124 and tickets 130 may be provided as inputs to decision optimization unit 122. Problem-actions mapping 126 and log data warning errors 128 also may be provided as inputs to decision optimization unit 122.

From the provided inputs, decision optimization unit 122 may identify true anomaly 134. A ticket may be raised automatically for true anomaly 134 identified by decision optimization unit 122.

Figure 2:
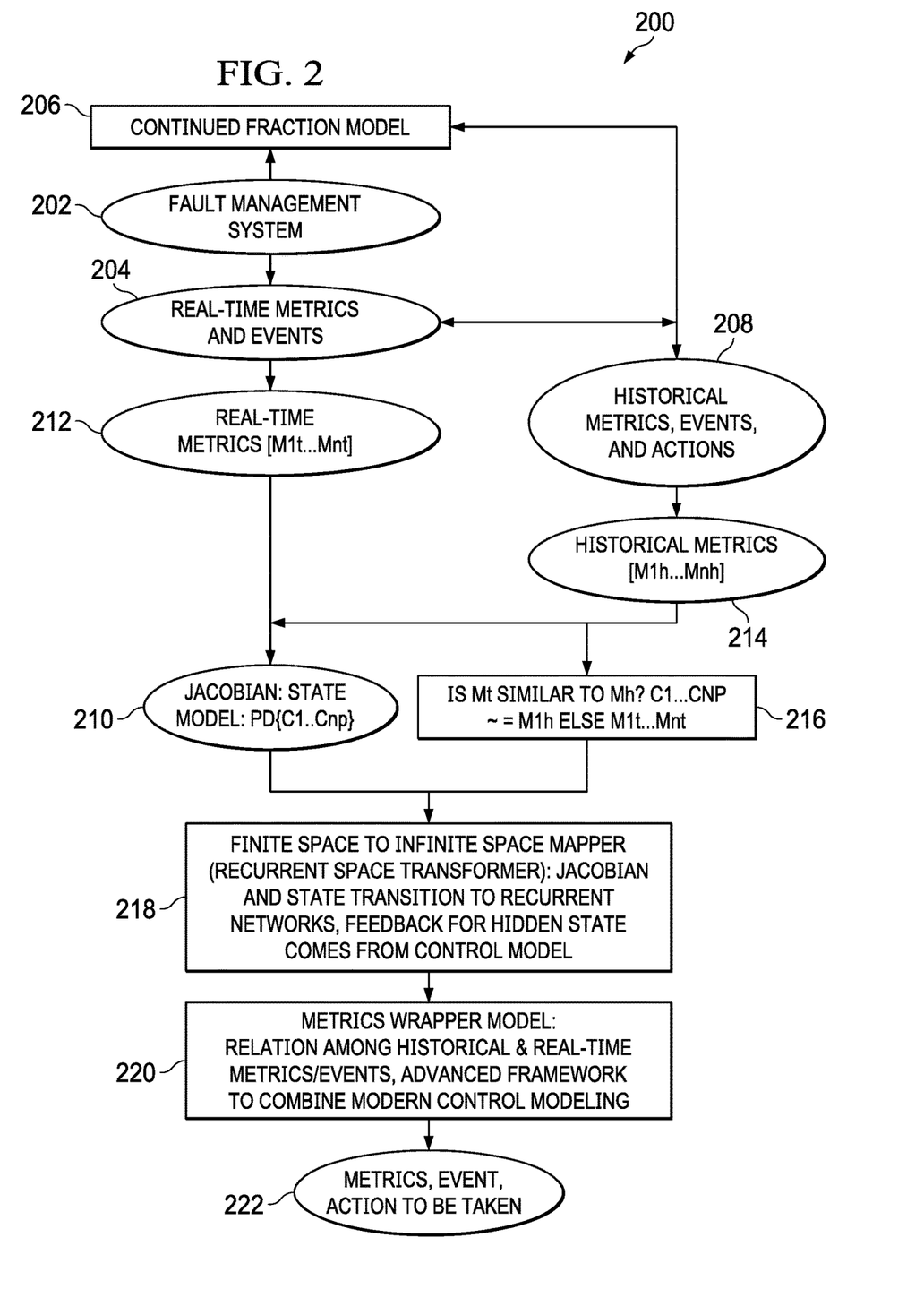
FIG. 2 is a block diagram of a high-level overview of a decision optimization system in accordance with an illustrative embodiment.

Turning to FIG. 2, a block diagram of a high level overview of a decision optimization system is depicted in accordance with an illustrative embodiment. Decision optimization system 200 may be an example of one implementation of decision optimization system 102 in FIG. 1.

Fault management system 202 may be a conventional fault management system for an information technology system. Fault management system 202 generates real time metrics and events 204. Real time metrics and events 204 may be processed by continued fraction model 206 to generate historical metrics, events, and actions 208.

Jacobian state model 210 may be applied to real-time metrics 212 from real time metrics and events 204. Real-time metrics 212 also may be combined with historical metrics 214 from historical metrics, events, and actions 208 to identify similarity 216 between real-time metrics 212 and historical metrics 214.

Finite space to infinite space mapper 218 may combine the output from Jacobian state model 210 and the determination of similarity 216 between real-time metrics 212 and historical metrics 214. Finite space to infinite space mapper 218 may be implemented using a recurrent space transformer. The output of finite space to infinite space mapper 218 may be processed by metrics wrapper model 220 to generate metrics, events, and actions to be taken 222.

Figure 3:
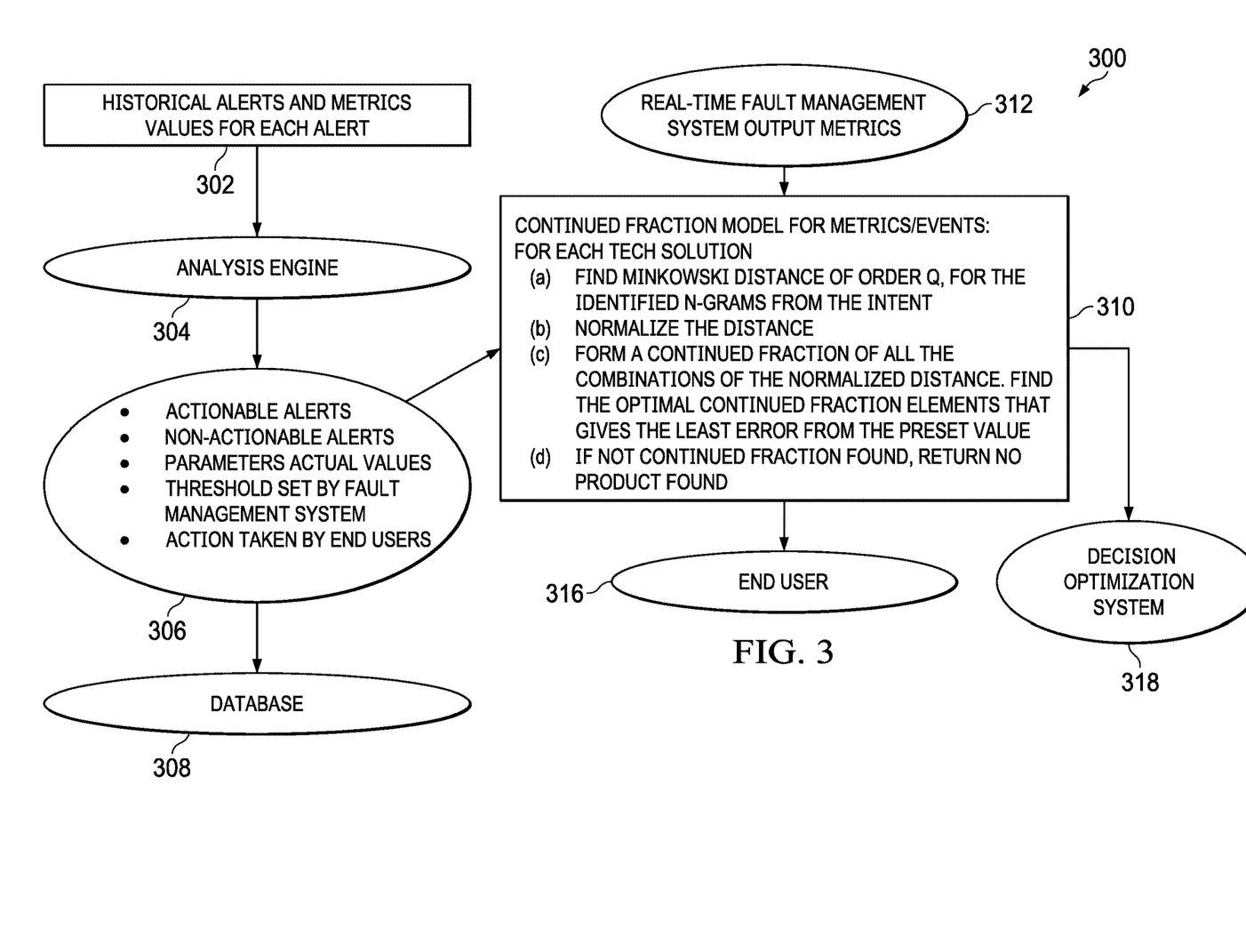
FIG. 3 is an illustration of a block diagram of a system for generating historical inputs for a decision optimization system in accordance with an illustrative embodiment.

Turning to FIG. 3, an illustration of a block diagram of a system for generating historical inputs for a decision optimization system is depicted in accordance with an illustrative embodiment. Historical alerts and metrics values for each alert 302 may be provided as inputs to analysis engine 304. Historical alerts and metrics values for each alert 302 may be provided by a fault management system from various accounts or a particular account. Analysis engine 304 generates segmentation 306 of actionable alerts, non-actionable alerts, parameters actual values, thresholds set by the fault management system, and actions taken by end users from the information regarding historical alerts and metrics values for each alert 302 provided to analysis engine 304. The information in segmentation 306 may be stored in database 308. Database 308 may be accessible online.

Continued fraction model 310 may be configured to extract segments of actionable alerts versus metrics mapping and scenarios. If real-time fault management system output metrics 312 are found by continued fraction model 310 in the information in segmentation 306 as stored in database 308 it may be reported directly to an end user 316. For example, without limitation, such information may be reported on an output screen to end user 316. Otherwise, real-time fault management system output metrics 312 may be sent to decision optimization system 318 for further classification and analytics.

Figure 4:
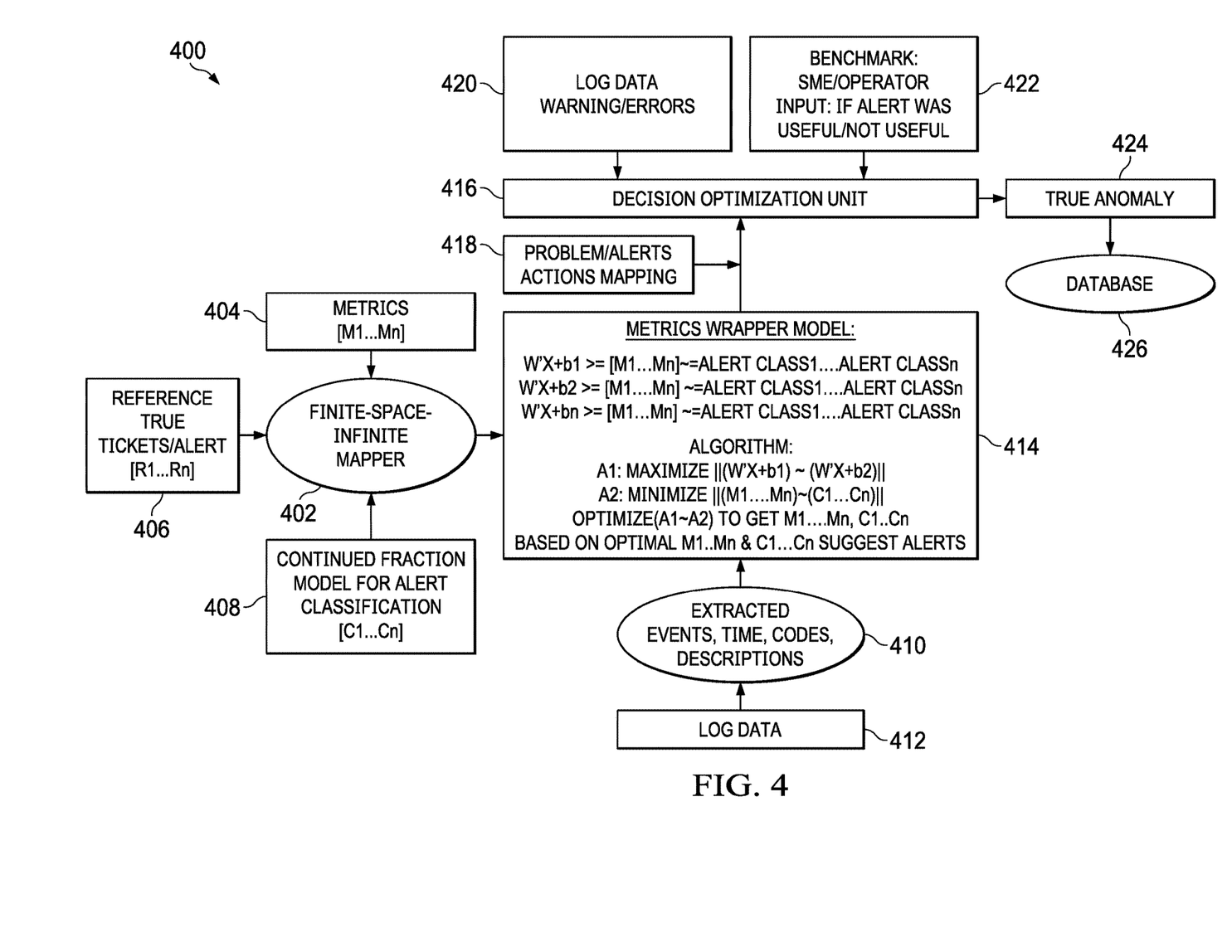
FIG. 4 is an illustration of a block diagram of a decision optimization system for a fault management system in accordance with an illustrative embodiment.

Turning to FIG. 4, an illustration of a block diagram of a decision optimization system for a fault management system is depicted in accordance with an illustrative embodiment. Decision optimization system 400 may be an example of one implementation of decision optimization system 102 in FIG. 1.

Metrics wrapper model 414 receives as inputs metrics 404 from a fault management system, reference true tickets 406, the output of continued fraction model 408, and extracted events, times, codes, and descriptions 410. Metrics wrapper model 414 may be known as an actionable alert segmentation model. Extracted events, times, codes, and descriptions 410 may be extracted from log data 412 by a log events processor. Metrics wrapper model 414 may form hyperplanes to create classifications for incoming alerts and generates various alert classes. Continued fraction model 408 and metrics 404 are used to optimize the difference and the closest metric parameters are selected to distinguish between actionable alerts and non-actionable alerts.

Decision optimization unit 416 may take into account log data warning errors 420 and benchmark 422 and to identify true anomaly 424. A ticket may be raised automatically when true anomaly 424 is identified. True anomaly 424 also may be saved in database 426.

Figure 5:
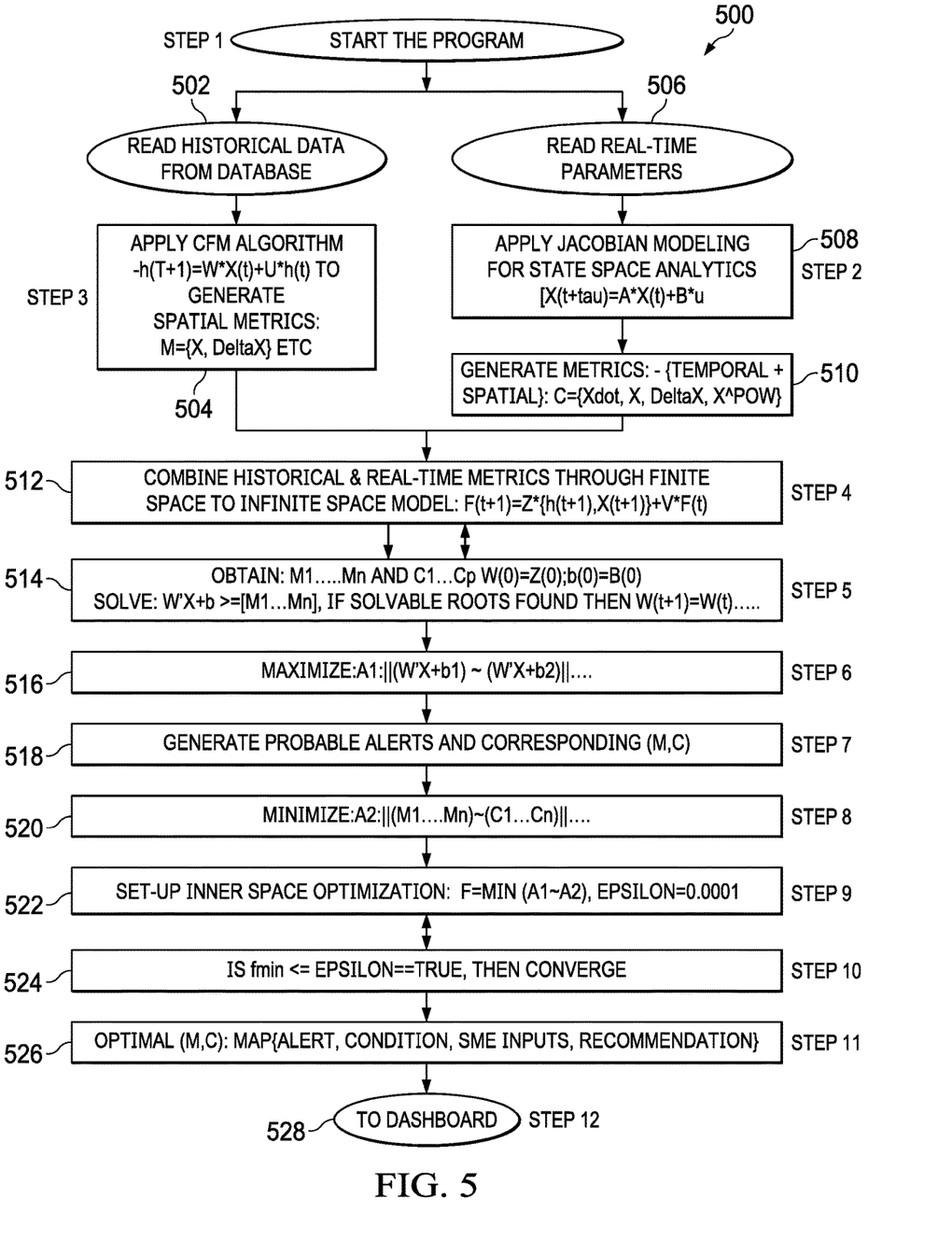
FIG. 5 is an illustration of a flowchart of a process for generating alerts in accordance with an illustrative embodiment.

Turning to FIG. 5, an illustration of a flowchart of a process for generating alerts is depicted in accordance with an illustrative embodiment. Process 500 is an example of one possible implementation in accordance with illustrative embodiments.

Process 500 may begin with reading historical data from a database (operation 502). A continued fraction model may then be applied to the historical data (operation 504). Operation 504 may include expressing the transfer function G(s) from numeric form to H(t,x) in set/subset form. A weighting/function curve may be varied through time and space. The best possible weights curve that relates the metrics to system behavior may be selected. Feedback may be provided to the previous state to obtain the current state.

Real time parameters also may be obtained from a fault management system (operation 506). Jacobian modeling for state space analytics may be applied to the real time parameters (operation 508) to generate metrics (operation 510). The Jacobian modeling may be used for dynamic slotting of ranges in the input, thus leveraging the advantages of staying within bounds. The operation of the Jacobian model on information technology data in operation 508 is to treat higher order states and still maintain finiteness, to deal with real time scenarios of metrics that bound system behavior within given space. Thus, Jacobian modeling is applied with dynamic slotting to generate higher order metrics within finite space.

The historical and real time metrics then may be combined through a finite space to infinite space model (operation 512). The model used in operation 512 may comprise a recurrent space transformer that combines continued fraction model metrics behavior and enhanced Jacobian metrics behavior by facilitating mapping on two different planes into a common plane. The model thus creates a common space to help optimization and solution convergence. Operation 512 may include merging, intersection, and redistribution of metrics coordinates from two spaces into a third one which may be a hyperplane.

Maximization is performed (operation 516) to generate probable alerts (operation 518). Minimization is then performed (operation 520) to set up inner space optimization (operation 522).

Convergence is then performed (operation 524) and alert conditions and recommendations may be generated (operation 526) and sent to a dashboard for display (operation 528), with the process terminating thereafter.

Figure 6:
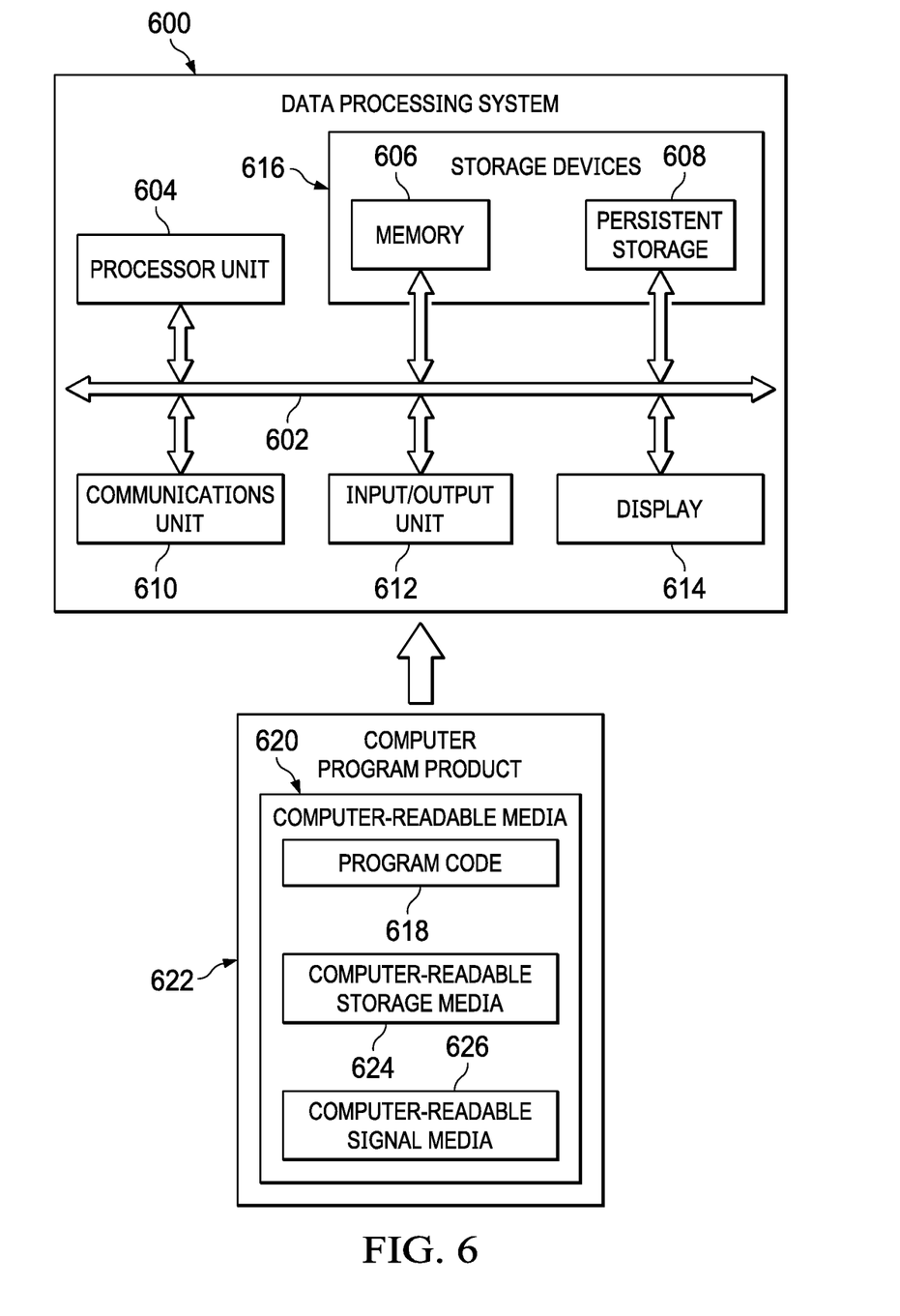
FIG. 6 illustrates a data processing system in accordance with an illustrative embodiment.

Turning to FIG. 6, a diagram of a data processing system is depicted in accordance with an illustrative embodiment. Data processing system 600 is an example of a system in which computer-readable program code or program instructions implementing processes of illustrative embodiments may be run. Data processing system 600 may be an example of one system in which cognitive closed loop analytics system 100 in FIG. 1 may be implemented. In this illustrative example, data processing system 600 includes communications fabric 602, which provides communications between processor unit 604, memory 606, persistent storage 608, communications unit 610, input/output unit 612, and display 614.

Processor unit 604 serves to execute instructions for software applications and programs that may be loaded into memory 606. Processor unit 604 may be a set of one or more hardware processor devices or may be a multi-processor core, depending on the particular implementation. Further, processor unit 604 may be implemented using one or more heterogeneous processor systems, in which a main processor is present with secondary processors on a single chip. As another illustrative example, processor unit 604 may be a symmetric multi-processor system containing multiple processors of the same type.

Memory 606 and persistent storage 608 are examples of storage devices 616. A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 606, in these examples, may be, for example, a random access memory, or any other suitable volatile or non-volatile storage device. Persistent storage 608 may take various forms, depending on the particular implementation. For example, persistent storage 608 may contain one or more devices. For example, persistent storage 608 may be a hard drive, a flash memory, a rewritable optical disk, a rewritable magnetic tape, or some combination of the above. The media used by persistent storage 608 may be removable. For example, a removable hard drive may be used for persistent storage 608.

Communications unit 610, in this example, provides for communication with other computers, data processing systems, and devices via network communications unit 610 may provide communications using both physical and wireless communications links. The physical communications link may utilize, for example, a wire, cable, universal serial bus, or any other physical technology to establish a physical communications link for data processing system 600. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 600.

Input/output unit 612 allows for the input and output of data with other devices that may be connected to data processing system 600. For example, input/output unit 612 may provide a connection for user input through a keypad, keyboard, and/or some other suitable input device. Display 614 provides a mechanism to display information to a user and may include touch screen capabilities to allow the user to make on-screen selections through user interfaces or input data, for example.

Instructions for the operating system, applications, and/or programs may be located in storage devices 616, which are in communication with processor unit 604 through communications fabric 602. In this illustrative example, the instructions are in a functional form on persistent storage 608. These instructions may be loaded into memory 606 for running by processor unit 604. The processes of the different embodiments may be performed by processor unit 604 using computer-implemented program instructions, which may be located in a memory, such as memory 606. These program instructions are referred to as program code, computer-usable program code, or computer-readable program code that may be read and run by a processor in processor unit 604. The program code, in the different embodiments, may be embodied on different physical computer-readable storage devices, such as memory 606 or persistent storage 608.

Program code 618 is located in a functional form on computer-readable media 620 that is selectively removable and may be loaded onto or transferred to data processing system 600 for running by processor unit 604. Program code 618 and computer-readable media 620 form computer program product 622. In one example, computer-readable media 620 may be computer-readable storage media 624 or computer-readable signal media 626. Computer-readable storage media 624 may include, for example, an optical or magnetic disc that is inserted or placed into a drive or other device that is part of persistent storage 608 for transfer onto a storage device, such as a hard drive, that is part of persistent storage 608. Computer-readable storage media 624 also may take the form of a persistent storage, such as a hard drive, a thumb drive, or a flash memory that is connected to data processing system 600. In some instances, computer-readable storage media 624 may not be removable from data processing system 600.

Alternatively, program code 618 may be transferred to data processing system 600 using computer-readable signal media 626. Computer-readable signal media 626 may be, for example, a propagated data signal containing program code 618. For example, computer-readable signal media 626 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 618 may be downloaded over a network to persistent storage 608 from another device or data processing system through computer-readable signal media 626 for use within data processing system 600. For instance, program code stored in a computer-readable storage media in a data processing system may be downloaded over a network from the data processing system to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to, or in place of, those illustrated for data processing system 600. Other components shown in FIG. 6 can be varied from the illustrative examples shown. The different embodiments may be implemented using any hardware device or system capable of executing program code. As one example, data processing system 600 may include organic components integrated with inorganic components and/or may be comprised entirely of organic components excluding a human being. For example, a storage device may be comprised of an organic semiconductor.

As another example, a computer-readable storage device in data processing system 600 is any hardware apparatus that may store data. Memory 606, persistent storage 608, and computer-readable storage media 624 are examples of physical storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606 or a cache such as found in an interface and memory controller hub that may be present in communications fabric 602.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of fault handling for an information technology system, comprising:
    reading historical data for the information technology system from a database;
    applying a continued fraction model to the historical data to generate spatial metrics;
    receiving real-time parameters for the information technology system;
    applying Jacobian modeling to the real-time parameters to generate state space metrics;
    combining the spatial metrics and the state space metrics using a recurrent space transformer to identify an actionable event in the information technology system, wherein the recurrent space transformer maps the spatial metrics and the state space metrics to a common space; and
    generating an alert in response to identifying the actionable event in the information technology system.

2. The computer implemented method of claim 1, wherein the historical data for the information technology system is selected from the group of historical data for the information technology system consisting of: actionable alerts, non-actionable alerts, parameters actual values, thresholds set by a fault management system for the information technology system, and actions taken by users of the information technology system.

3. The computer-implemented method of claim 1, wherein the real-time parameters for the information technology system comprise real-time outputs from a fault management system for the information technology system.

4. The computer-implemented method of claim 1, wherein the recurrent space transformer comprises a finite space to infinite space model.

5. The computer-implemented method of claim 1, wherein generating the alert comprises automatically generating a ticket for the actionable event for an issue tracking system for the information technology system.

6. The computer-implemented method of claim 1 further comprising displaying the alert to an operator of the information technology system.

7. The computer-implemented method of claim 1 further comprising:
  identifying a recommended response to the actionable event; and
  reporting the recommended response to an operator of the information technology system.

8. A system for fault handling for an information technology system, comprising:
  a decision optimization system configured to:
    read historical data for the information technology system from a database,
    apply a continued fraction model to the historical data to generate spatial metrics,
    receive real-time parameters for the information technology system,
    apply Jacobian modeling to the real-time parameters to generate state space metrics, and
    combine the spatial metrics and the state space metrics using a recurrent space transformer to identify an actionable event in the information technology system, wherein the recurrent space transformer maps the spatial metrics and the state space metrics to a common space; and
  a decision optimization unit configured to generate an alert in response to identifying the actionable event in the information technology system.

9. The system of claim 8, wherein the historical data for the information technology system is selected from the group of historical data for the information technology system consisting of: actionable alerts, non-actionable alerts, parameters actual values, thresholds set by a fault management system for the information technology system, and actions taken by users of the information technology system.

10. The system of claim 8, wherein the real-time parameters for the information technology system comprise real-time outputs from a fault management system for the information technology system.

11. The system of claim 8, wherein the recurrent space transformer comprises a finite space to infinite space model.

12. The system of claim 8, wherein the decision optimization unit is configured to generate a ticket for the actionable event for an issue tracking system for the information technology system.

13. The system of claim 8, wherein the decision optimization unit is configured to send the alert to a dashboard to display the alert to an operator of the information technology system.

14. The system of claim 8, wherein the decision optimization unit is configured to:
  identify a recommended response to the actionable event; and
  report the recommended response to an operator of the information technology system.

15. A non-transitory computer-readable storage medium storing program code, which when executed by a processor, performs a computer-implemented method of fault handling for an information technology system, comprising:
  reading historical data for the information technology system from a database;
  applying a continued fraction model to the historical data to generate spatial metrics;
  receiving real-time parameters for the information technology system;
  applying Jacobian modeling to the real-time parameters to generate state space metrics; and
  combining the spatial metrics and the state space metrics using a recurrent space transformer to identify an actionable event in the information technology system, wherein the recurrent space transformer maps the spatial metrics and the state space metrics to a common space; and
  generating an alert in response to identifying the actionable event in the information technology system.

16. The non-transitory computer-readable storage medium of claim 15, wherein the historical data for the information technology system is selected from the group of historical data for the information technology system consisting of: actionable alerts, non-actionable alerts, parameters actual values, thresholds set by a fault management system for the information technology system, and actions taken by users of the information technology system.

17. The non-transitory computer-readable storage medium of claim 15, wherein the real-time parameters for the information technology system comprise real-time outputs from a fault management system for the information technology system.

18. The non-transitory computer-readable storage medium of claim 15, wherein the recurrent space transformer comprises a finite space to infinite space model.

19. The non-transitory computer-readable storage medium of claim 15, wherein generating the alert comprises automatically generating a ticket for the actionable event for an issue tracking system for the information technology system.

20. The non-transitory computer-readable storage medium of claim 15 further comprising program code stored on the non-transitory computer readable storage medium for displaying the alert to an operator of the information technology system.

* * * * *